United States Patent [19]

Bozeman, Jr.

[11] Patent Number: 5,539,402
[45] Date of Patent: Jul. 23, 1996

[54] SYSTEM FOR MEMORIZING MAXIMUM VALUES

[75] Inventor: Richard J. Bozeman, Jr., Dickinson, Tex.

[73] Assignee: The United States of America as represented by the Administrator of the National Aeronautics and Space Administration, Washington, D.C.

[21] Appl. No.: 924,213

[22] Filed: Aug. 3, 1992

[51] Int. Cl.⁶ .................................................. H03M 1/12
[52] U.S. Cl. ........................ 341/132; 341/155; 235/492
[58] Field of Search .................................. 341/132, 155; 235/441, 492; 365/96, 225.7

[56] References Cited

U.S. PATENT DOCUMENTS

| | | | |
|---|---|---|---|
| 3,471,853 | 10/1969 | Brooks et al. | 341/132 |
| 3,631,410 | 12/1971 | Velasco | 341/155 X |
| 4,001,604 | 1/1977 | Parks et al. | 341/126 |
| 4,654,634 | 3/1987 | Thong et al. | 340/347 R |
| 4,773,046 | 9/1988 | Akaogi et al. | 365/96 |
| 4,803,646 | 2/1989 | Burke et al. | 364/561 |
| 4,816,829 | 3/1989 | Podolak et al. | 341/122 |
| 4,856,318 | 8/1989 | Hogan et al. | 73/12 |
| 4,866,441 | 9/1989 | Conway et al. | 341/122 |
| 4,903,111 | 2/1990 | Takemae et al. | 365/96 X |
| 5,027,118 | 6/1991 | Nicolai | 341/132 |
| 5,086,216 | 2/1992 | Mollet et al. | 235/492 |

*Primary Examiner*—Marc S. Hoff
*Attorney, Agent, or Firm*—James M. Cate

[57] ABSTRACT

The invention discloses a system capable of memorizing maximum sensed values. The system includes conditioning circuitry which receives the analog output signal from a sensor transducer. The conditioning circuitry rectifies and filters the analog signal and provides an input signal to a digital driver, which may be either linear or logarithmic. The driver converts the analog signal to discrete digital values, which in turn triggers an output signal on one of a plurality of driver output lines n. The particular output lines selected is dependent on the converted digital value. A microfuse memory device connects across the driver output lines, with n segments. Each segment is associated with one driver output line, and includes a microfuse that is blown when a signal appears on the associated driver output line.

5 Claims, 1 Drawing Sheet

SYSTEM FOR MEMORIZING MAXIMUM VALUES

The invention described herein was made by an employee of the United States Government and may be manufactured and used by or for the Government of the United States of America for governmental purposes without the payment of any royalties thereon or therefor.

BACKGROUND OF THE INVENTION

The present invention relates generally to a device for measuring and memorizing a sensed value. More particularly, the invention relates to a circuit connected to a sensor to measure the maximum values detected by the sensor.

Oftentimes it is advantageous to measure the forces applied to the components of a dynamic system. In some systems, such as those which handle and transport freight, the forces usually are random. In such cases it may be advantageous to know the maximum force applied to the system or to its components during a predetermined period of time. In other systems, forces may be repetitive causing vibrations. Such vibrations may vary in magnitude and frequency. Once again, the magnitude of such vibrations may be of interest.

Various apparatuses for the recording of such information relating to force or vibration are known. For example, inertia devices utilize the concept of single preset trip points. Inertia devices tend to be mechanical, rather than electrical, and are often bulky. Furthermore, inertia devices offer limited information, as each triggering level requires a separate inertia device. Because of their large size and inability to measure various triggering levels, it often is impossible to use the prior art inertia devices in situations where space is limited. In addition, because the prior art devices usually are mechanical, they also are subject to malfunction if excessive forces are encountered.

Alternatively, composite data acquisition systems may be used to record force and vibrational information. Such systems measure and record data electronically, rather than mechanically. They are relatively expensive, are often bulky, and require playback and analysis from system memory devices. Also, the electrical power requirements for composite data acquisition systems are relatively high. Thus, where space is limited, or where the monitoring period is long, these types of devices are impractical.

One example of a composite data acquisition system may be found in U.S. Pat. No. 4,654,634. U.S. Pat. No. 4,654,634 discloses an apparatus for processing a sequence of digital data values with the object of increasing the ratio of signal-to-quantization noise of a digitized repetitive signal in order to enhance resolution. An algorithm for removing noise from a data string is included. The apparatus receives an input analog signal and applies it to a conventional analog-to-digital converter. The digitized waveform data from the analog-to-digital converter is stored in memory and processed according to the algorithm.

Similarly, U.S. Pat. No. 4,856,318 discloses an apparatus for measuring the G forces which occur during an impact and stores the maximum measured value. The impact, or deceleration, force is measured by means of a transducer which may be an accelerometer, or other type of transducer such as a forced balance type, strain gauge, or load cell. Voltage output from the transducer is amplified, its peak value detected, and sent to an analog-to-digital convertor. The output of the analog-to-digital convertor is sent to a display. The operational amplifier disclosed in U.S. Pat. No. 4,856,318 is expressly designed to act as a voltage follower and current amplifier, so that the voltage curve recorded for an impact or deceleration is recorded and then maintained at its peak value. A continuous power source is required for operation, because the display means of U.S. Pat. No. 4,856,318 requires a current flow, and because the voltage signal, which goes to the display and which reflects the peak impact force, must be maintained. Without continuous power, the display of the measured force would disappear, as no current indicating a value would be present. Without the operational amplifier disclosed in U.S. Pat. No. 4,856,318, a peak voltage would reflect an impact but the circuitry would allow the voltage to drop to zero once the apparatus had decelerated to zero velocity. Again, no display would be possible.

None of the prior art devices permit the recording of the maximum acceleration to which an object is subjected by means of a device which does not require power, and which may be visually read at any time following the measuring period. Consequently, if there is a power outage, or if the measurement period is excessively long, resulting in battery failure, the prior art devices will not save the maximum values.

SUMMARY OF THE INVENTION

Accordingly, there is provided herein a system for measuring the output value of a sensor and for storing the value permanently in a simple, inexpensive memory device. The system comprises a simple, low cost, energy efficient, stand-along module capable of use with a conventional sensor transducer.

The system conditions the analog output signal from a high output sensor such as an accelerometer and inputs the signal to a driver. The driver, according to the preferred embodiment, converts the analog signal to a plurality of discrete digital levels and provides digital outputs on its multiple output lines in a sequential manner. Each of the output lines of the driver connects to a microfuse memory device. A signal on a particular driver output line triggers an associated microfuse in the memory device. After the measuring period, the memory device is removed and examined to determine the maximum sensed value by determining which microfuses have been triggered.

The device also includes circuitry to calibrate the system for the particular sensor being used. A potentiometer preferably is used on the input line to the driver which can be adjusted so that the maximum output available from the sensor triggers the highest output line on driver that represents the highest output from the driver.

BRIEF DESCRIPTION OF THE DRAWINGS

For a more detailed description of the preferred embodiment of the invention, reference will now be made to the accompanying drawings, wherein.

DETAILED DESCRIPTION OF THE PREFERRED EMBODIMENT

Figure 1:
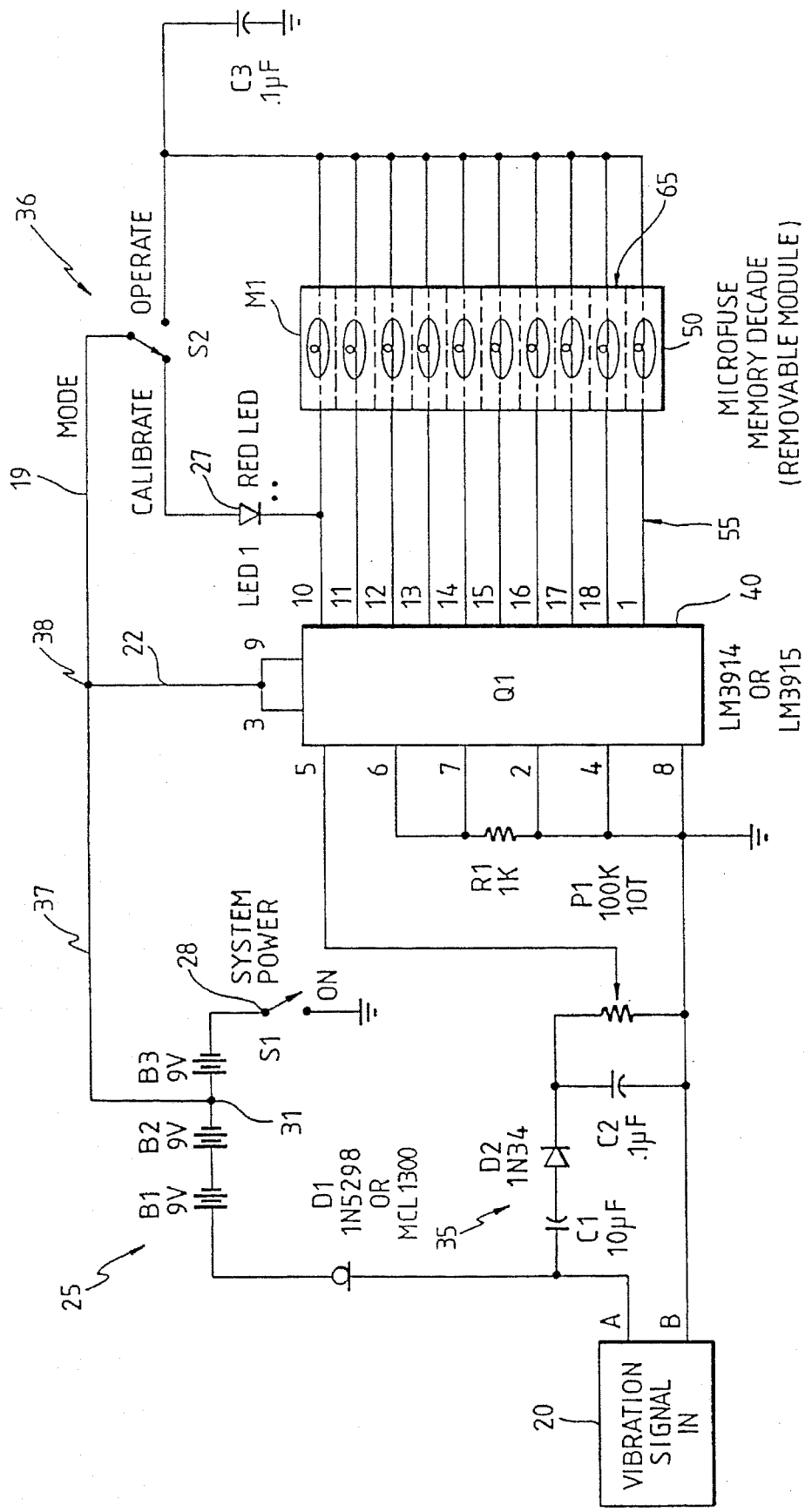
FIG. 1 is a schematic illustration of the circuitry of the preferred embodiment.

The present invention was designed specifically for use on space flights to measure and memorize the maximum G forces encountered and measured during a space flight by an on-board high output accelerometer. While the present invention was developed to measure G forces, it can be used advantageously with any type of sensor transducer that produces a variable output. In addition, the present invention has application outside of the space industry and can be used in any situation where it is desirable to measure and memorize maximum sensed values of a particular phenomenon.

Referring now to FIG. 1, the invention constructed in accordance with the preferred embodiment generally comprises a power source 25, signal conditioning circuitry 35, a driver 40, and a simple memory unit 50. In addition, calibration circuitry comprising potentiometer P1, calibration switch 36 and LED 27 preferably are included to calibrate and scale the system as will be discussed more fully below.

The power source 25 preferably comprises a plurality of dc batteries B1, B2, B3 connected to a power switch 28. Alternatively, as one skilled in the art will realize, a single dc battery may be substituted. The power switch 28, which preferably comprises a single-pole-single-throw switch, in turn connects to ground. The positive terminal of battery B1 connects to the anode of a current regulator device, which preferably comprises a field effect diode D1. The cathode of diode D1 connects to the positive output of the sensor 20. The diode D1 preferably regulates sensor current between 2–4 milliamperes.

In the preferred embodiment, the dc battery source preferably comprises three 9-volt batteries, B1, B2 and B3 connected in series to obtain 27 volts to power the sensor and the system circuitry when switch S1 is in the ON position.

If a calibration circuit is used in accordance with the preferred embodiment, a terminal 31 preferably is provided between batteries B2 and B3. In the preferred embodiment, an electrical lead 37 connects to terminal 31, to provide 9 volts dc to the driver 40 and memory unit 50. The other end of lead 37 connects to a terminal 38. Electrical lead 22 connects to terminal 38 and to the power input of the driver 40, which is shown as pins 3 and 9 in FIG. 1. Another electrical lead 19 connects terminal 38 to a calibration switch 36.

In the preferred embodiment, calibration switch 36 preferably comprises a single pole-double-throw switch. The first pole of switch 36, which places the system in the calibration mode, connects through an LED 27 to the output on pin 10 of the driver 40. In the preferred embodiment, pin 10 represents the highest output value of driver 40. The second pole of switch 36, which places the system in the operation mode, connects to each of the output terminals of the memory unit 50. In addition, a capacitor C3 preferably connects between the second pole (the operation pole) and ground to prevent transient signals from triggering the memory unit 50.

The signal conditioning circuitry 35 connects across the output terminals A, B of the sensor 20 and preferably comprises a capacitor C1 connected to the output line A of sensor 20, a diode D2, and a capacitor C2. The anode of diode D2 connects in series to the capacitor C1. Capacitor C2 connects across the cathode of diode D2 and the output line B of sensor 20. Output line B preferably connects to ground. Potentiometer P1 connects in parallel to capacitor C2 and across the cathode of diode D2 and ground line B of sensor 20. The slider or wiper of the potentiometer P1 preferably is applied as an input to the driver 40, which is shown as pin 5.

In the preferred embodiment, driver 40 includes an input for receiving the analog signal (shown as pin 5), and ten output lines (shown as pins 1 and 10–18). The driver 40 preferably comprises a 10 level display driver that measures an analog input signal and provides a sequential digital output on the 10 output lines 55 corresponding to the analog input level. Two conventional drivers that may be used are a National Semiconductor LM 3914 (for linear conversion) or a National Semiconductor LM 3915 (for logarithmic conversion). The logarithmic converter is preferred for use with an accelerometer to more precisely measure low magnitude vibrations and to provide more dynamic ranging.

Resistor R1 connects to certain inputs of driver 40 to bias the output of driver 40. Pins 6 and 7 of driver 40 connect to the first terminal of resistor R1. Pins 2, 4 and 8 of driver 40 connect to the second terminal of resistor R1, as does the output line B of sensor 20. As will be understood by those skilled in the art, resistor R1 biases the current that appears on each of the 10 digital output lines 55 of driver 40. A 1000 ohm value for resistor R2 sets the maximum output current for any output line 55 of driver 40 at 10 milliamperes.

As mentioned, the driver 40 preferably includes ten output lines 55. Each output line represents a particular analog value, with pin 10 representing the maximum possible value. Thus, according to conventional techniques, the driver preferably receives an analog input signal at pin 5. The driver converts the analog signal into discrete digital values and emits an output signal (current sink high to low) on the ten output lines 55 in a sequential increasing manner as the analog level increases. Each of the output lines 55 is associated with one of the discrete digital values corresponding to the analog input. Thus, for example, an output signal on pin 1 of driver 40 may denote a 0.5 "G" acceleration obtained from a 0.5 volt (PEAK) output from sensor 20, whereas an output signal on pins 1 and 18 signifies a 1.0 volt (PEAK) output from sensor 20 representing 1.0 G acceleration. In the preferred embodiment, an output on pins 1 through 10 and 18 represents a 5 volt output (PEAK) from sensor 20 which represents 5.0 G acceleration.

The memory unit 50 preferably comprises a volatile microfuse memory device with ten separate segments 65, corresponding to the ten output lines 55 from the driver 40. Each segment 65 of the memory 50 comprises a single plug-in transparent cap microfuse. In the preferred embodiment, the microfuses are Littlefuse. The transparent cap is provided for easy viewing, so that the blown fuses may be readily determined. In the preferred embodiment, the microfuse fires when only 2 milliamperes of current is drawn through it. Preferably, each segment of memory unit 50 connects on one side to an associated output line 55 from driver 40. On the other side, each segment preferably is connected between capacitor C3 and calibration switch 36.

Alternatively, larger fuses could be used in place of the microfuses to permit easy viewing of the blown fuse. If larger fuses are used, a conventional current driver is provided in the output lines 55 of driver 40 to increase the current received by the larger fuses to insure that those fuses are activated.

According to the preferred embodiment, system calibration occurs by disconnecting sensor 20 from the terminals A and B, turning the power off, setting switch 36 to the calibration mode, and capacitively coupling a 5 volt (PEAK) signal at 500 Hz across terminals A and B. Switch 28 is then turned on to provide system power. Potentiometer R1 is manually adjusted until the light emitting diode 27 illuminates, indicating that pin 10 (representing the highest output) of driver 40 has been activated. When LED 27 is illuminated, the system calibration is complete and the calibration source is removed and switch 36 is switched to the operate mode.

In operation, a sensor 20, such as an accelerometer, preferably is connected across terminals A and B. The sensor 20 preferably has an output of 5 volts (PEAK) at full scale. Thus, for example, an accelerometer with a range of 0 to 50 "G" would produce 5 volts (PEAK) at 50 "G". The sensor device is powered by the voltage from the batteries B1, B2 and B3, while field effect diode D1 preferably limits the current to the accelerometer between approximately 2–4 milliamperes.

When the desired phenomenon is sensed, an output signal appears on terminals A, B of the sensor 20. The output signal enters the circuit through capacitor C1, which blocks any dc bias from the sensor output signal. Capacitor C1 also blocks the sensor supply voltage from the battery. The ac component of the output signal is applied to diode D2 where it is rectified in accordance with conventional techniques. The output signal is smoothed and levelled, and momentarily retained, by capacitor C2. Once capacitor C2 charges, the conditioned signal is applied through potentiometer R1, which has been previously calibrated to scale the analog signal.

The conditioned analog signal is scaled by potentiometer R1 and applied to the input (shown in FIG. 1 as pin 5) of the driver 40. According to conventional techniques, the driver 40 converts the analog signal to discrete digital levels, either linearly or logarithmically. Each of the ten output lines of driver 40 is associated with one of the ten discrete digital levels. Thus, the output lines on which the signal occurs is determined by the conversion to the ten discrete levels. A 10 milliampere output signal appears on the output line 55 of driver 40 associated with the converted value. The output signal on the output line 55 fires the associated microfuses in microfuse memory unit 50. It should be noted that a number of the microfuses may be blown up to and including the maximum sensed level. Thus, for example, in a linear converter, a 5 G signal will blow all microfuses up to and including line 10 of driver 40, while a 2 G signal will blow the microfuses up to and including the microfuse associated with pin 16 of driver 40.

At the end of the measurement period, the memory unit 50 is removed and the microfuses are examined to determine which have fired and thus, which output line 55 of driver 40 was triggered. Once it is known which fuses have blown, one skilled in the art can easily determine the maximum sensed value.

While a preferred embodiment of the invention has been described herein, one skilled in the art will immediately realize that many variations can be made without departing from the spirit of the present invention.

I claim:

1. A system for sensing and storing an analog output signal from a sensor that senses values representative of a phenomenon during a predetermined period, comprising:

signal conditioning circuitry connected to the output of the sensor to receive and condition the analog output signal of the sensor;

a digital driver for receiving the conditioned analog output signal and for converting the analog output signal to a digital value which triggers one of a plurality of output lines representative of the digital value;

an independent visible memory unit with a plurality of segments, each of which is associated with a particular output line of said driver which senses and stores a triggered output from said driver, each of said segments including a removable microfuse with a transparent cap for easy viewing;

a calibration circuit including a switch to actuate the circuit and a potentiometer to calibrate and determine delay time of the conditioned analog output signal with the driver; and a dc battery source powering said sensor, said driver, and said memory unit.

2. A device for memorizing maximum values, comprising:

a sensor device for measuring a particular phenomenon and for providing a sensor output analog signal representative of the phenomenon;

a driver with an input line for receiving the sensor output analog signal, and a plurality of driver output lines, said driver including a means for measuring the magnitude of the sensor output analog signal and providing a driver output digital signal on at least one of said plurality of output lines which is dependent on the measured magnitude of the sensor output analog signal;

a nonvolatile, independent visible memory device connected across each of the plurality of driver output lines for receiving the driver output digital signal and storing it in memory, the memory device including a plurality of removable microfuses having transparent caps for easy viewing;

calibration circuitry connected to said driver to adjust the magnitude of said sensor output analog signal to said driver; and a dc power source providing operating power to said device.

3. A device as in claim 2, wherein the sensor output signal is an analog signal.

4. A device as in claim 2, wherein the driver is logarithmic and said means for measuring comprises a logarithmic converter that performs a logarithmic conversion of said sensor output signal to one of the discrete digital levels, which in turn triggers one of said output lines.

5. A device as in claim 2, wherein the driver is linear and said means for measuring comprises a linear converter that performs a linear conversion of said sensor output signal to one of the discrete digital levels, for triggering one of said output lines n.

* * * * *